Feb. 12, 1963 W. M. EVANS 3,077,559
SYSTEM FOR STARTING INDUCTION MOTORS
Filed Feb. 11, 1958 3 Sheets-Sheet 1

INVENTOR.
WILLIAM M. EVANS,
BY
Flam and Flam
ATTORNEYS.

Feb. 12, 1963 W. M. EVANS 3,077,559
SYSTEM FOR STARTING INDUCTION MOTORS
Filed Feb. 11, 1958 3 Sheets-Sheet 2

INVENTOR.
WILLIAM M. EVANS

Flam and Flam
ATTORNEYS.

INVENTOR.
WILLIAM M. EVANS
BY
Flam and Flam
ATTORNEYS.

United States Patent Office 3,077,559
Patented Feb. 12, 1963

3,077,559
SYSTEM FOR STARTING INDUCTION MOTORS
William M. Evans, La Habra, Calif., assignor, by mesne assignments, to The Emerson Electric Manufacturing Company, St. Louis, Mo., a corporation of Missouri
Filed Feb. 11, 1958, Ser. No. 714,547
14 Claims. (Cl. 322—60)

This invention relates to the starting of induction motors in conjunction with alternators.

It is now well-known simultaneously to adjust the speed of a number of induction motors, by adjusting the frequency of the common source of supply to such motors. The common source is an alternator, the speed of which can be adjusted. An induction motor is usually provided to drive the alternator through a transmission mechanism, the ratio of which is continuously variable through a range. Such transmission mechanisms are now well-known; and one form is that utilizing pulley structures of the Reeves type that have variable effective diameters in conjuction with edge-active belts.

Usually all of the slave motors are simultaneously started and stopped by starting and stopping the motor that drives the alternator. Heavy starting currents are drawn from the alternator by the slave motors. Such heavy currents reduce the electromotive force available at the terminals of the alternator, with a consequent reduction in starting torque. Accordingly, it has been common to provide oversize alternators for such demands.

By the aid of this invention, the use of oversize alternators is obviated. This result is accomplished by temporarily increasing the excitation for the alternator. This temporary increase may raise the excitation to as much as four times the normal running value.

By the aid of this expedient, the power output of the alternator is temporarily increased, and well able to fulfill the power demands during the starting period.

It is another object of this invention to render the increase in alternator excitation dependent upon operation of the start button for the motor driving the alternator.

It is still another object of this invention to limit the period of over-excitation, as by time delay devices or the like. This has the advantage that the rectifiers supplying field current for the alternator have a long life, since the period of overloading is limited. In the usual form of rectifier, the elements have a life approximately proportional to the square of the operating temperature; accordingly, the control of the period of overload is quite important.

It is still another object of this invention to make it possible to apply at will additional motor torque to the slave motors during a duty cycle.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
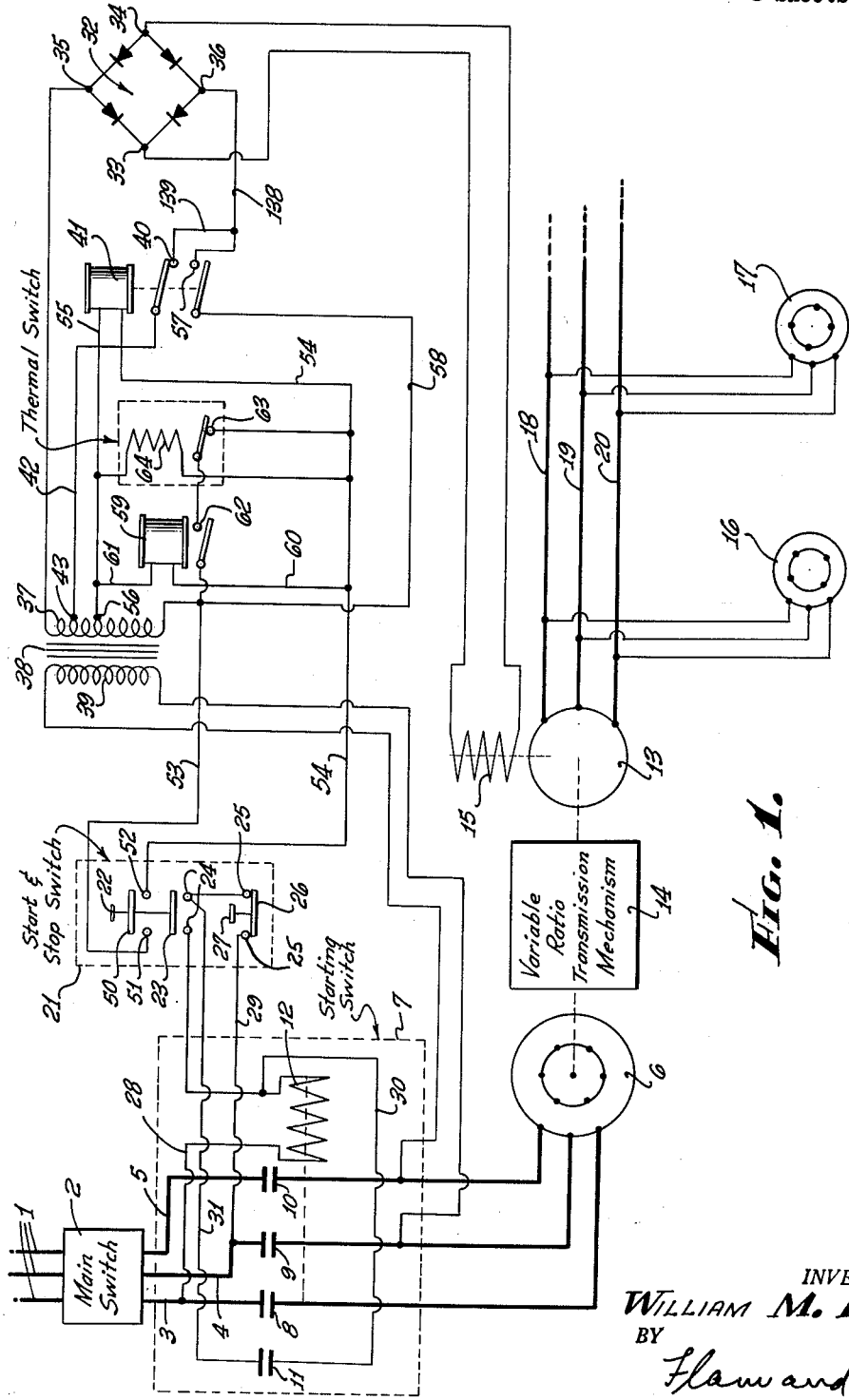
FIGURE 1 is a wiring diagram of a system incorporating an embodiment of the invention.

The power leads of a system incorporating the invention are indicated in heavy lines in FIG. 1. Thus, the three-phase mains 1 are connected as by a main switch 2 to the leads 3, 4 and 5, supplying power to an induction motor 6. A starting switch 7 including main contacts 8, 9 and 10 is located between the main switch 2 and the induction motor 6. Auxiliary contacts 11 of switch 7 are also included for starting puroposes, as hereinafter explained.

The starting switch 7 is arranged to be closed by the energization of an electromagnet 12 which serves simultaneously to close the contacts 8, 9, 10 and 11. When the electromagnet 12 is deenergized, the induction motor 6 is deenergized, and the system comes to rest.

The induction motor 6 drives an alternator 13 at adjustable speeds by the aid of a variable ratio transmission mechanism 14, interposed between the induction motor 6 and the alternator 13. This variable ratio transmission mechanism can be of the type that is continuously adjustable within limits. It may include pulleys having adjustable effective diameters, such as the well-known Reeves type. A field or exciting winding 15 is provided for the alternator 13. Slave motors 16, 17, etc. may be connected directly across the three-phase mains 18, 19 and 20, which lead to the output terminals of the alternator 13.

A start and stop switch mechanism 21 is provided for starting and stopping the induction motor 6. The start switch includes a manually operable push button 22, normally urged to the position shown. It carries a movable contact member 23 adapted to cooperate with the stationary contacts 24. The push button 22 may be held manually in closed position. As soon as the button is released, it returns to the position illustrated in FIG. 1. The start and stop switch 21 also includes normally closed contacts 25. These contacts are closed by a conducting member 26 carried by a stop button 27.

When the start button 22 is depressed, the electromagnet 12 for the starting switch 7 is energized as follows: from main 3, connection 28, electromagnet 12, the contact-making members 23—24, the contact-making members 25—26 and connection 29 to main 4.

This energization of the electromagnet 12 causes all of the four contact members 8, 9, 10 and 11 to close. As soon as this is accomplished, the push button 22 may be released; there is a holding circuit for the electromagnet 12 through the following path: from main 3, connection 28, electromagnet 12, connection 30, switch contacts 11, connection 31, right-hand contact 24, contact elements 25—26 and conductor 29 to the main 4.

Obviously by depressing the stop button 27, this circuit just traced is interrupted and the induction motor 6 is deenergized.

The circuit for the electromagnet 12 may also be interrupted in the usual manner by appropriate devices responding to overload conditions. Since such devices are well-known, further description of the starting and stopping mechanism is considered unnecessary.

The exciting or field winding 15 of alternator 13 is connected across the output terminals 33, 34 of a rectifier 32. The input terminals 35, 36 are connected as hereinafter described to a secondary winding 37 of a transformer 38. The primary winding 39 of this transformer is connected across two of the leads feeding electrical energy to the induction motor 6.

In normal operation, with the induction motor 6 running at normal speed, the input terminals 35 and 36 are connected across a relatively small portion of the secondary winding 37 corresponding to a low potential source. Under such conditions, the input circuit for the rectifier may be traced as follows: from the upper terminal of secondary winding 37, input terminal 35, rectifier 32, input terminal 36, connections 138 and 139, normally closed back contacts (of the normally deenergized relay 41), and connection 42 to a tap 43 on winding 37. The potential difference between the upper terminal of winding 37 and tap 43 is relatively small.

Figure 5:
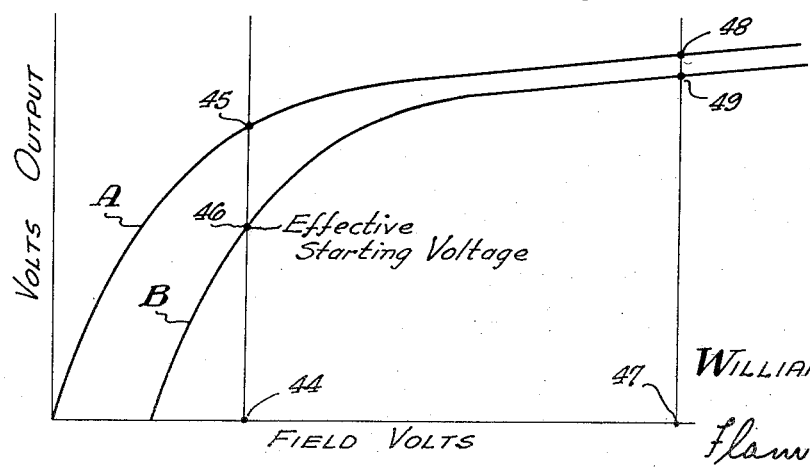
FIG. 5 is a graph illustrating certain features of the invention.

During the starting period, it is desirable to increase substantially the potential difference applied across the input terminals 35 and 36. This results in making it possible for the alternator 13 to withstand the rush of current incident to the creation of the starting torque for motors 6, 16 and 17. Reference in this regard may be had to the graphs A and B of FIG. 5. The abscissas of these graphs correspond to field volts or excitation. The graph A corresponds to the volts output at the terminals of the alternator 13 when the alternator carries no load. This curve conforms quite closely to a magnetic saturation curve. This is apparent since the volts output is a function of the total magnetic flux of the field, which flux in turn follows the magnetic saturation pattern.

Normal excitation corresponding to the running condition of the system may be represented by the abscissa corresponding to point 44. The ordinate erected at this point, terminating on the curve A at a point 45, corresponds to the volts output at no load.

When the system is started by motor 6, motors 16 and 17 create a large current drain and a corresponding voltage drop internally of the alternator; the voltage across the terminals of the alternator 13 drops to a point 46, substantially below point 45. This point 46 falls on the curve B, the ordinates of which correspond to the effective starting voltages plotted against excitation volts.

Let us assume that the excitation current or field volts be increased, say for example four-fold to a point 47. The ordinates of points 48 and 49 on curves A and B would represent the open circuit volts and the effective starting volts respectively available at the terminals of the alternator 13. It is seen that the regulation of the alternator 13 output volts is much improved, since there is a relatively small drop in voltage, corresponding to the vertical distance between the points 48 and 49.

To take advantage of this, means are provided for temporarily increasing the input volts to the rectifier 32, during the starting period. For this purpose, the start button 22 carries a bridging conductor 50 which is arranged to complete a circuit between contact members 51 and 52. Accordingly, when the start button 22 is depressed, the contacts 51 and 52 are bridged. Under such circumstances, the relay 41 is energized through the following circuit: from the lower terminal of the secondary winding 37, connection 53, conducting elements 51, 50 and 52, connection 54, relay 41, and connection 55 to an intermediate tap 56 on the secondary winding 37. Thus, as soon as this circuit is completed by the start button 22, the back contacts 40 open and the normally open front contacts 57 close. Now when this happens, the rectifier input terminals 35 and 36 are connected across the entire secondary winding 37. This circuit may be traced as follows: upper terminal of winding 37, input terminal 35, rectifier 32, input terminal 36, connection 138, contacts 57, and connection 58 to the lower terminal of the winding 37.

As soon as this circuit is completed, a holding circuit paralleling contacts 51 and 52 is established. This is effected by energization of a relay 59. This relay is energized through the contacts 51 and 52, and conductors 60 and 61. As soon as this relay is energized, the normally open contacts 62 are closed and the circuit for the relay 41 remains closed, even after the stop button 22 is released, as follows: from the lower terminal of winding 37, contacts 62, normally closed contacts 63 of a thermal relay 64, relay 41, conductor 55 to the tap 56. The relay 59 remains energized from the lower terminal of winding 37, contacts 62 and 63, connections 54 and 60, relay 59 and conductor 61 to the tap 56. The thermal relay 64 is similarly energized between conductors 54 and 55, the two relays 59 and 64 being permanently in parallel.

The thermal relay 64 is so arranged that when the operative elements of the relay heat up, the contacts 63 are opened. When this happens, all of the relays 59, 64 and 41 return to their normal unenergized position shown in FIG. 1, and the rectifier 32 is provided with its normal input voltage. Usually about a ten second delay is sufficient to ensure that the motor 6 and the slave motors 16 and 17 have attained operating speed. Accordingly, it is safe to reduce the excitation for the alternator 13.

In the system illustrated in FIG. 1, it may be advantageous to continue the forcing of the excitation only so long as the start button 22 is depressed. Under such circumstances, the relays 59 and 64 may be entirely omitted. The energization of the relay 41 is then dependent solely upon the depression of the start button 22. When this start button is released, the excitation returns to normal.

Figure 2:
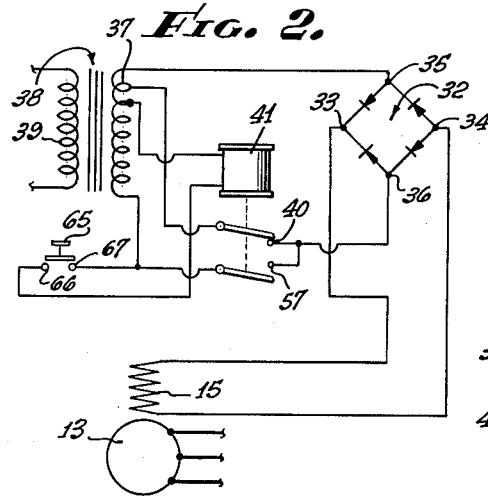
FIGS. 2, 3 and 4 are fragmentary wiring diagrams illustrating modified forms of the invention.

It may sometimes be desirable at will to increase the excitation independent of the starting operation. This may occur, for example, when unusual or heavy loads are imposed upon the alternator 13. A simplified arrangement to accomplish this is illustrated in FIG. 2. In this instance, a normally open push button 65 may be operated in order to bridge the contacts 66 and 67. When these contacts are bridged, the relay 41 is energized, which effects the same changes as the relay 41 in the form shown in FIG. 1. When the push button 65 is released, the circuit returns to that shown in FIG. 2 corresponding to normal excitation.

Figure 3:
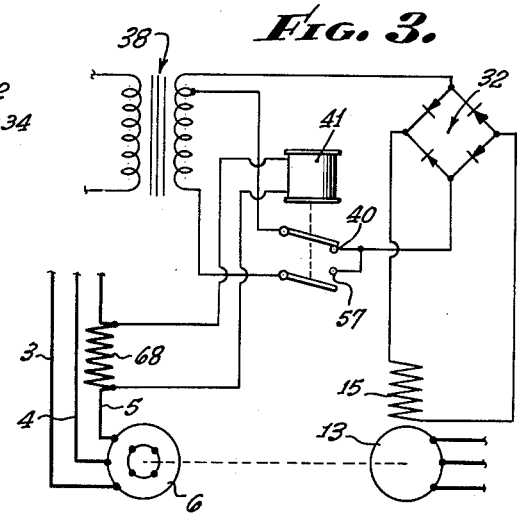

Another form is shown in FIG. 3 in which the relay 41 is energized by the voltage drop across a resistance 68. This resistance 68 can be located in one of the leads supplying current to the motor 6. During the starting period, the drop across the resistance 68 is quite substantial and the relay 41 is sufficiently energized to provide the forced excitation. When the starting period is over, the drop across the resistance 68 is insufficient to operate the relay 41.

Figure 4:
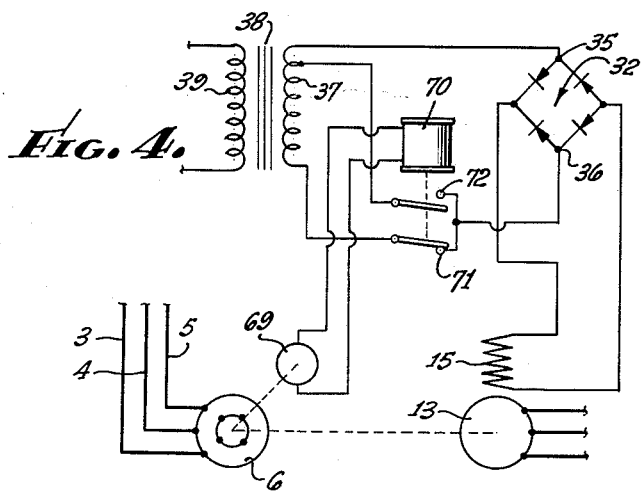

In the form shown in FIG. 4, a tachometer generator 69 is coupled to be driven by any of the motors 6, 16, 17. During normal operation, the tachometer 69 is operated at high speed; and the generated voltage is sufficient to energize a relay 70. However, during starting, the generated voltage of the tachometer 69 is not sufficient to engergize the relay. Accordingly, during the starting period, the back contacts 71 are closed and the input terminals 35 and 36 for the rectifier 32 are subjected to the full potential drop across the secondary winding 37. However, when the motors 6, 16 or 17 speed up, the relay 70 becomes sufficiently energized to be operative. Under such circumstances, the contacts 71 open and instead the normally open contacts 72 are closed. The excitation for the alternator 13 returns to normal.

Figure 6:
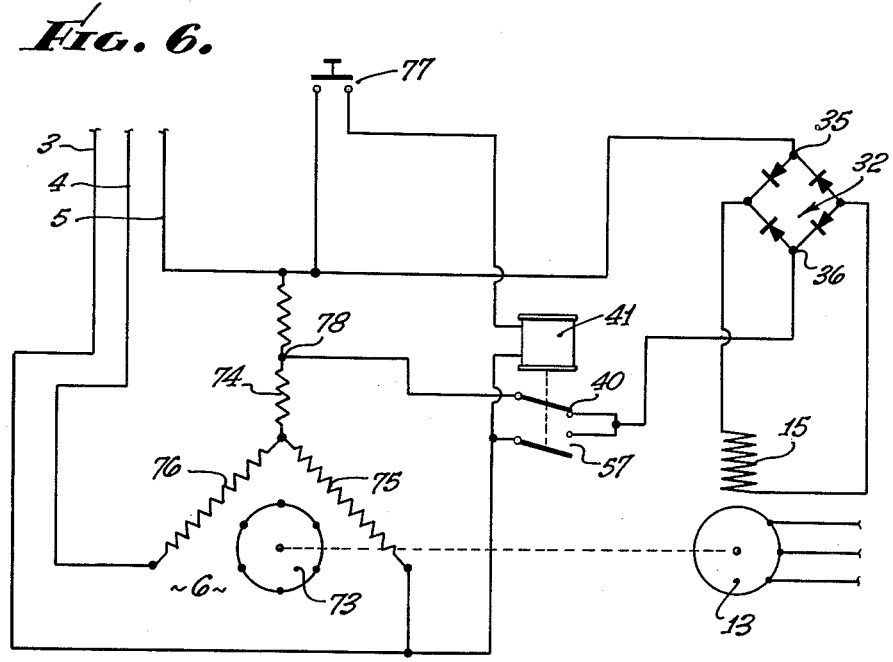
FIGS. 6 and 7 are fragmentary wiring diagrams of additional modifications, in which the input side of the rectifier is supplied with an electromotive force across points in the stator windings of the motor that drives the alternator.
Figure 7:
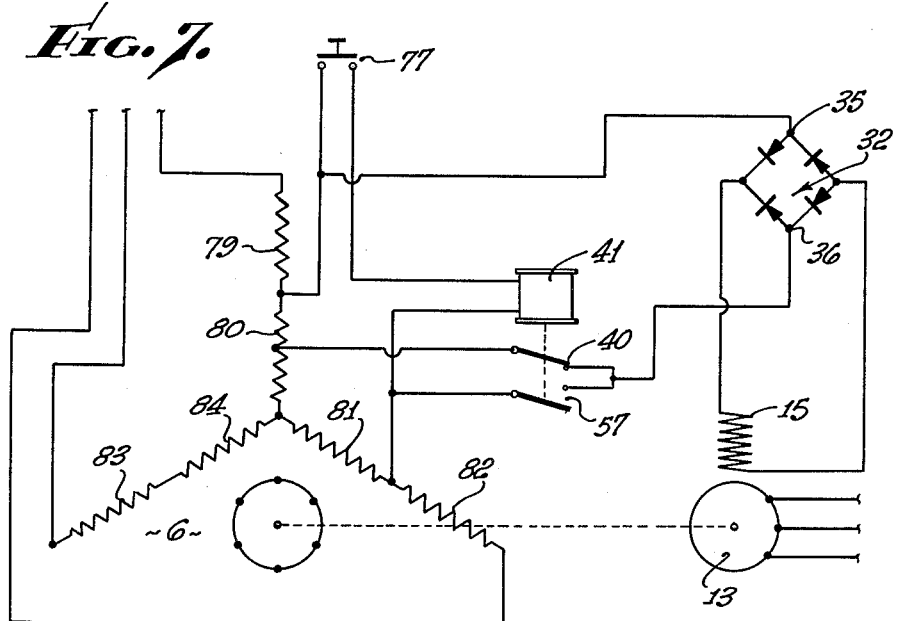

In the forms thus far described, the transformer 38 is used to supply the rectifier 32. In FIGS. 6 and 7, such a transformer is obviated by taking taps from the induction motor winding.

Thus in FIG. 6, the mains 3, 4, 5 are shown as supplying current to a Y winding for the stator of induction motor 6. This Y winding includes the three sections 74, 75 and 76. The rotor 73 is indicated diagrammatically. The windings 74, 75 and 76 are of the type adapted for use with relatively low voltage as 220 volts.

A push button circuit controller 77 causes energization of the relay 41. In the unenergized position, this relay 41, as before, has the normally closed contacts 40 and the normally open contacts 57.

While the relay 41 is deenergized, the input terminals 35 and 36 of the rectifier 32 are connected across only a relatively small section of the winding 74. This circuit may be traced as follows: from main 5, to rectifier terminal 35, rectifier 32, terminal 36, contact 40 and tap 78 of the winding 74. Accordingly, the drop across the input terminals 35 and 36 is that which occurs over a fraction of the stator winding 74.

When the push button 77 is depressed, the relay 41 is energized. Under such circumstances, a full voltage between the mains 3, 4 and 5 is impressed across the terminals 35 and 36. Thus, the circuit may be traced from main 5, terminal 35, rectifier 32, terminal 36, contact 57 to terminal 3.

In the form shown in FIG. 7, the stator windings are shown as adapted for a Y-connected relatively high voltage motor such as 440 volts. Thus, the stator windings each include a pair of sections 79, 80; 81, 82; and 83, 84.

During normal operation of the push button 77 in the open position shown, the rectifier terminals 35 and 36 are connected across only a small portion of the winding 80. However, when the push button 77 is depressed and energizes the relay 41, the terminals 35 and 36 are connected across the windings 80 and 81.

The inventor claims:

1. In a system including an alternator, an induction motor for driving the alternator at an adjustable speed, a motor load for the alternator, a starting circuit for the driving motor including a starting switch adapted to be only temporarily closed, and an exciting circuit for the field of the alternator, the combination therewith of means for increasing the excitation of the alternator above normal, and for a limited time period, including circuit-controlling means operative only when the starting circuit is effective.

2. In a system including an alternator, an induction motor for driving the alternator at an adjustable speed, a motor load for the alternator, a starting circuit for the induction motor, and an exciting circuit for the field of the alternator, the combination therewith of means for increasing the excitation of the alternator above normal, including circuit-controlling means operative when the starting circuit is effective; and means for limiting the time period when the increased excitation is effective.

3. In combination: an alternator; an induction motor for driving the alternator at an adjustable speed; a motor load for the alternator; an exciting circuit for the field of the alternator; and means for increasing the excitation of the alternator above normal including a manually operable circuit controller which is ineffective after a time period upon termination of the manual operation.

4. In combination: an alternator; an induction motor for driving the alternator at an adjustable speed; an exciting circuit for the field of the alternator; said exciting circuit including a rectifier having an input fed from a source of alternating current, as well as an output supplying the exciting current; circuit-controlling means for increasing the electromotive force applied to the input of the rectifier; and time delay means cooperating with the circuit-controlling means for limiting the period during which the increased electromotive force is effective.

5. The combination as set forth in claim 3, with the addition of a starting circuit for the driving motor, and in which the manually operable circuit controller is simultaneously operated when the starting circuit is energized.

6. The combination as set forth in claim 1, in which the increase in excitation is such as to carry the resultant magnetization of the alternator field beyond the knee of saturation.

7. The combination as set forth in claim 3, in which the increase in excitation is such as to carry the resultant magnetization of the alternator field beyond the knee of saturation.

8. The combination as set forth in claim 4, in which the increased electromotive force is from two to five times the normal electromotive force applied to the rectifier.

9. In a system including an alternator, a motor load for the alternator, an induction motor for driving the alternator at an adjustable speed, a starting circuit for the driving motor, and an exciting circuit for the field of the alternator, the combination therewith of: a relay having contacts, said relay when deenergized causing the excitation to be normal, and when energized, causing the excitation to be increased beyond normal; manually controlled means for energizing said relay; and holding means for the relay to energize it for a limited time only.

10. In a system including an alternator, an induction motor for driving the alternator at an adjustable speed, a starting circuit for the motor, and an exciting circuit for the field of the alternator, the combination therewith of: a first relay having contacts, said first relay when deenergized causing the excitation to be normal, and when energized, causing the excitation to be increased beyond normal; manually controlled means for energizing said first relay; and holding means for the first relay, including a time delay relay having normally closed contacts and delaying opening of the contacts after the time delay relay is energized; a holding relay having normally open contacts; both the time delay relay and the holding relay being energized by the manually controlled means when the first relay is energized; the contacts of the time delay relay and of the holding relay being in series and in the energizing circuits for all three relays.

11. In combination: an alternator having a direct-current field winding for exciting the alternator; an electric motor system for driving the alternator; a motor load for the alternator; means for exciting said field winding; control means for said exciting means providing a normal excitation for said winding during normal running operation of said driving motor system, and an increased excitation for said winding, above said normal excitation, during start-up of said driving motor system; and means responsive to the start-up condition of said driving motor system for operating said control means to automatically effect said increased excitation during start-up of said driving motor system and to automatically effect a return to said normal excitation substantially at the end of the start-up period.

12. In the combination of claim 11: said motor system including a starting switch; and said means responsive to start-up condition including a switch element operated by said starting switch to effect said increased excitation, and further including a time delay element to effect said return to normal excitation.

13. In the combination of claim 11: said means responsive to start-up condition comprising means for developing a signal in response to the current flow through the driving motor field winding and for operating said control means in accordance therewith.

14. In the combination of claim 11: said means responsive to start-up condition comprising means for developing a signal in response to the rate of rotation of the driving motor rotor and for operating said control means in accordance therewith.

References Cited in the file of this patent

UNITED STATES PATENTS

| | | |
|---|---|---|
| 925,499 | Parsons et al. | June 22, 1909 |
| 2,321,969 | Bany | June 15, 1943 |
| 2,492,527 | Haas | Dec. 27, 1949 |
| 2,504,878 | Reilly | Apr. 18, 1950 |
| 2,879,465 | Wood | Mar. 24, 1959 |